UNITED STATES PATENT OFFICE.

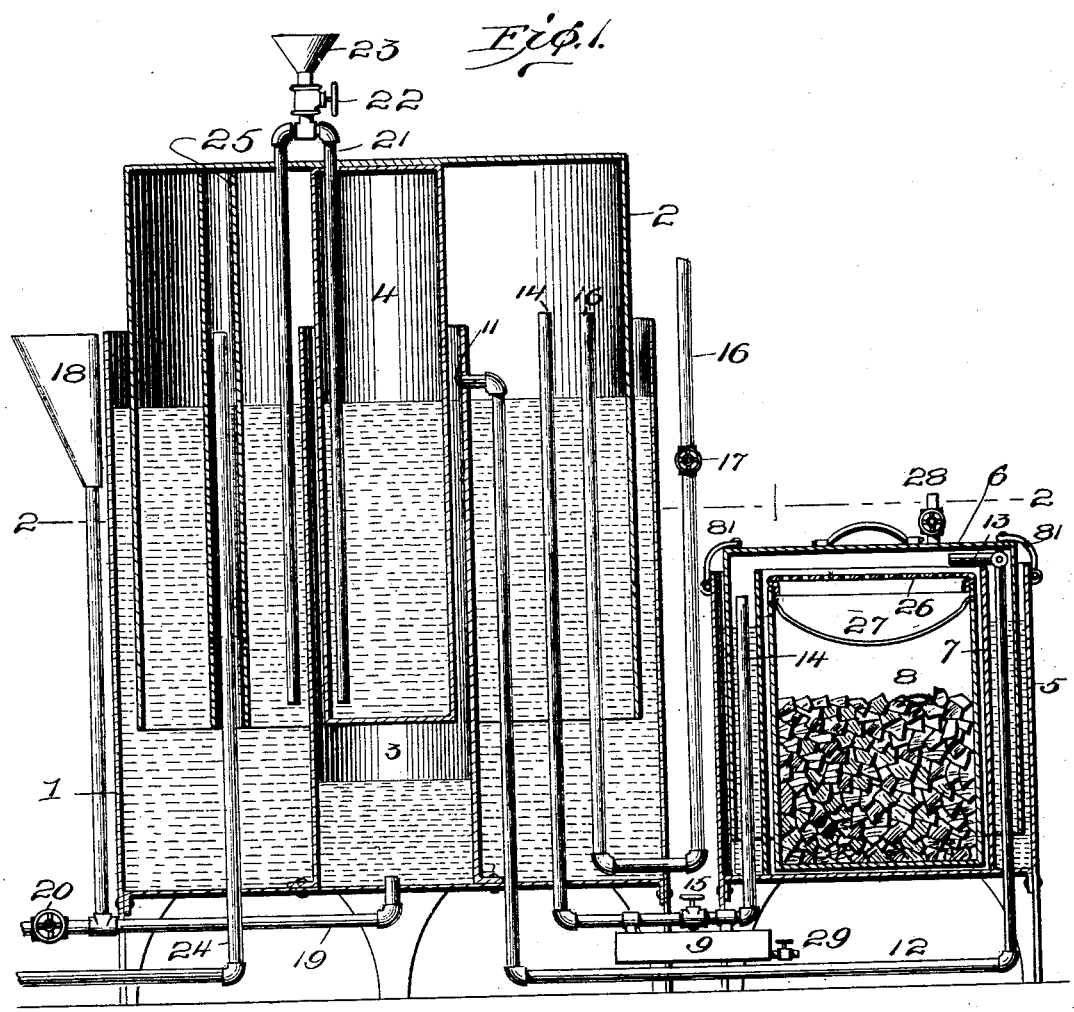

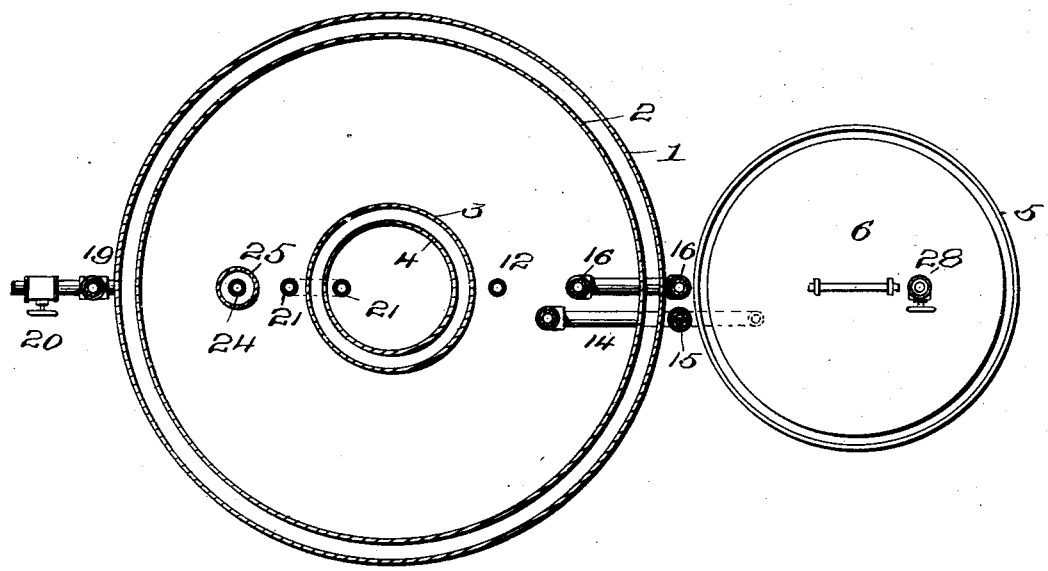
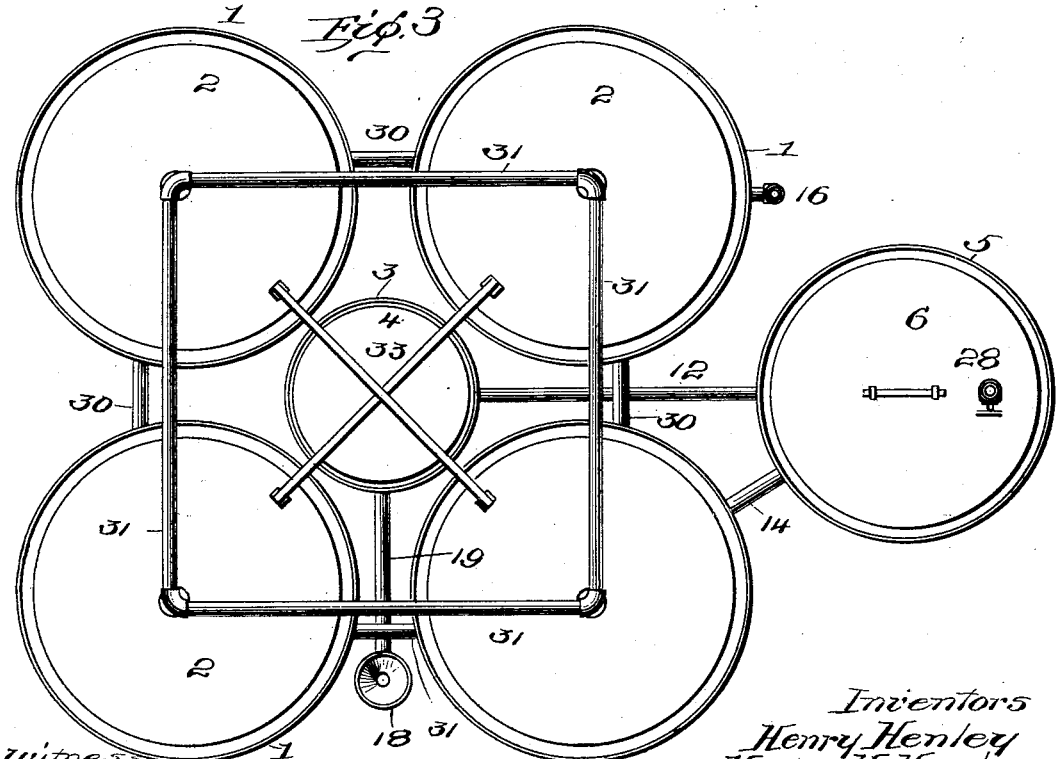

HENRY HENLEY AND HENRY HOWE HENLEY, OF BLOOMINGTON, INDIANA.

ACETYLENE-GAS GENERATOR.

SPECIFICATION forming part of Letters Patent No. 713,303, dated November 11, 1902.

Application filed March 6, 1902. Serial No. 96,954. (No model.)

*To all whom it may concern:*

Be it known that we, HENRY HENLEY and HENRY HOWE HENLEY, of Bloomington, Monroe county, and State of Indiana, have invented certain new and useful Improvements in Acetylene-Gas Generators; and we hereby declare that the following is a full, clear, and exact description thereof, reference being had to the accompanying drawings, which form part of this specification.

This invention is an improvement in acetylene-gas-generating apparatus; and its object is to produce a very sensitive automatic apparatus in which the water is delivered to the carbid holder or generator in small quantities, the supply of water being regulated by the rise and fall of the gas-holder.

The principal feature of the invention is the novel construction of the water-feeding devices, which are so constructed that very slight movements of the gasometer will suffice to cause or stop the feed of water and which will prevent large quantities of water being injected onto the carbid, the apparatus being practically so sensitive in operation that a substantially uniform pressure and supply of gas can be maintained under all conditions of service.

Another object of the invention is to enable one water-feeding device to serve for a plurality of generators.

Another object is to so construct the gas-holder and plunger carried thereby that the weight of the plunger will be continually counterpoised—that is, when the gas-holder rises the plunger will be lightened, and vice versa—so that a substantially uniform gas-pressure is maintained in the gasometer whether the amount of gas therein be much or little.

The invention consists in novel water-feeding devices, in novel means for equipoising the water-displacing plunger, and in novel combinations and constructions of parts hereinafter claimed and described with reference to the accompanying drawings, in which—

Figure 1 represents a vertical longitudinal sectional view of the present preferred form of apparatus. Fig. 2 is a horizontal section on line 2 2, Fig. 1. Fig. 3 is a detail top view illustrating a modification of the apparatus.

Referring to said drawings, 1 designates the tank of the gasometer, within which is the gas holder or receiver 2. A smaller tank 3 is preferably placed within the tank 1 in the simplest form of construction, (shown in Fig. 1,) and within tank 3 moves a large hollow plunger 4, which is suspended from the gas-holder 2, so as move therewith. The plunger is of such size as to almost fill tank 3 when the gas-holder is lowered. The tank 1 is nearly filled with water, as usual, and the tank 3 is supplied with water by means of a pipe 19 connecting with a funnel 18 and provided with a drain-cock 20. Only a small quantity of water is placed in tank 3, because when plunger 4 descends therein the water is displaced rapidly.

The generator is preferably located outside the gasometer, and consists of a small tank 5, closed by a bell 6, and within the bell and tank is a carbid-chamber 7, in which is a removable carbid-holder 8, provided with a handle 27 and a perforated cover 26, onto which the water is ejected and through the perforations therein disseminated onto the carbid in the holder. The water is supplied to the generator by a pipe 12, which connects with the tank 3 near the top thereof and then leads out of the gasometer into tank 5, as shown, connecting above holder 8 with a short pipe 13, which projects over the cover of the holder and discharges water thereon. The pipe 13 is hinge-jointed to pipe 12, so that it can be swung up out of the way when the carbid-holder is to be removed from or replaced in chamber 7. The bell 6 is provided with an air-cock 28, which is opened when the bell and carbid-holder are to be removed and closed during the operation of the apparatus.

The gas passes from the generator through a pipe 14 into the gasometer, said pipe opening into the generator and gasometer above the water-levels therein, as shown. Pipe 14 is provided with a drain-cock 15 and it connects at its lowest point with a mud-drum or drip-pan 9, into which tar or refuse deposited in the pipe can escape, drum 9 being provided with a draw-off cock 29 for cleaning it.

The gas is withdrawn from the gasometer through a pipe 16, connecting with the service-pipes, as usual, and provided with a stopcock 17. The gasometer may also be provided with a suitable safety blow-off. As shown, a tube 25 is attached to the bell and depends below the water-level and is provided with openings near its lower end. Into tube 25 telescopes a pipe 24, which extends outside the gasometer to a suitable point. The tube remains water-sealed until it is raised by the bell sufficiently to permit gas to escape into the tube through the perforations in the lower end thereof.

The plunger 4 is preferably hollow and contains more or less water, according to the elevation of the gas-holder, the water in the plunger being automatically kept at a level with the water in tank 1 by any suitable connection therebetween. For this purpose the siphon 21 (shown in Fig. 1) is employed. The siphon is hung on the bell. One leg passes into the water in the plunger, extending down close to the bottom of the latter, and the other leg passes outside the plunger and tank 3 into the water in tank 1, the siphon-legs being about equal. The siphon is provided with a filling-funnel 23, the connection therebetween being closable by a cock 22. The plunger is supplied with water until it stands therein at a level with that in tank 1. The siphon is then filled and cock 22 closed.

The apparatus is operated as follows: After the tanks 1 and 5 are nearly filled with water the holder, with a proper supply of carbid, is placed in chamber 7, the perforated cover 26 put in place, and pipe 13 turned down thereover. Then bell 6 is sunk in tank 5 and aircock 28 closed and bell 6 fastened down securely in any suitable manner, as by hooks 81. Then cock 15 is opened. Cock 17 is closed until gas is wanted in service-pipes, the gas-holder 2 and plunger 4 being in the lowest position. Water is poured through funnel 18 until it rises in tank 3 to the opening 11 and escapes thence through pipe 12 into the generator, when the gas being generated immediately passes back through pipe 14 into the gas-holder and the latter rises, lifting the plunger 4 more rapidly than water is supplied through pipe 19. When the gas-holder begins to rise, the operator should stop supplying water to tank 3. A very slight upward movement of the gas-holder and plunger permits and causes the water in tank 3 to drop below the opening 11, cutting off the supply to the generator until the gas-holder again descends. After the gas-holder has risen a foot or two a few gallons of water should be introduced into the tank 3, which will suffice to insure the automatic operation of the apparatus until the carbid is exhausted. An amount of water which is known to be sufficient to exhaust all the carbid in the gasometer will be the proper amount to feed into tank 3 after the gas-holder begins to rise.

The automatic operation of the apparatus is rendered very sensitive and reliable by the fact that the plunger so nearly fills the tank 3 that as it moves therein the water will rise and fall very rapidly in tank 3 and to a considerable extent therein with comparatively very slight movements of the plunger. The blow-off pipe 24 will be seldom needed, as the gas will ordinarily be used about as rapidly as it is generated and the supply of water is cut off the instant the gas-holder moves upwardly from its lowermost position.

As the plunger enters the water its weight (on the gas-holder) is lessened by the displacement of the water, and as it rises its weight (carried by the gas-holder) would naturally increase as it emerges from the water, and to prevent undue fluctuation in the weight of or on the gas-holder the water should be maintained at a common level in the plunger and tank 1. As the gas-holder rises with the plunger water flows from the plunger through pipe 21 into the tank 1, and as the gas-holder descends water flows from tank 1 into the plunger, thus automatically preserving a substantially uniform weight and pressure upon the gas in the gas-holder.

It will be noted that the plunger and tank 1, located within the gas-holder, serve to guide the latter in its vertical movements.

If desired, the water-feed tank and plunger may be connected with two or more similar generators where a large gasometer is employed, which permits one generator to be cleaned and refilled while another is generating gas. Also, if desired, the water-feed devices may be placed outside the gasometer, as indicated in Fig. 3, where the plunger is suspended from the gas-holder by a rigid connection, so as to rise and fall therewith. Fig. 3 also shows how a plurality of gasometers may be supplied with gas from one or more generators with a single water-feed device exterior to the gasometers. In this figure four gasometers are shown surrounding the water-feed tank 3, the plunger 4 being suspended from the gas-holders 2 by connections 33, which also serve to keep the gas-holders in position. The gas-holders communicate through pipes 31 and the tanks 1 communicate by pipes 30.

The construction of a water-feed device wherein a plunger or equivalent device causes a displacement of the water in the tank, so as to cause the water to rise or fall in the tank more rapidly than the plunger moves, is an important feature of the invention, and we do not restrict ourselves to the specific construction and arrangement of such feed device shown and described, and the connections for establishing a substantially uniform water-level in the plunger and tank, so as to maintain a substantially uniform weight on the gas-holder, is another novel feature of the invention which is not restricted to the particular construction shown and described.

Having thus described our invention, what we therefore claim as new, and desire to secure by Letters Patent thereon, is—

1. In an acetylene-gas-generating apparatus, a generator, a gas-holder connecting therewith to receive gas therefrom, a tank, a feed-pipe, connecting the tank and the generator, a hollow plunger in the tank adapted to displace water therein, water-circulating connections between the gasometer-tank and plunger, and connections between the gas-holder and plunger whereby the latter is actuated by the former, substantially as described.

2. In an acetylene-gas-generating apparatus, a gasometer, a water-feed tank, a hollow plunger actuated by the gas-holder of the gasometer, and pipe connections between the plunger and gasometer-tank for circulating water therebetween, substantially as described.

3. In an acetylene-gas-generating apparatus, a gasometer, a water-feed tank, a hollow plunger actuated by the gas-holder of the gasometer, and pipe connections between the plunger and gasometer-tank for circulating water therebetween, a generator communicating with the gasometer, and a water-feed pipe connecting the generator with the water-feed tank, substantially as described.

4. The combination of the gasometer, a water-feed tank, a hollow plunger suspended from the gas-holder, and within the water-feed tank, a generator, a water-feed pipe connecting the generator, with the water-feed tank, and a siphon connection between the hollow plunger and the gasometer-tank, substantially as described.

5. An acetylene-gas generator, and a water-supply pipe leading to said generator, in combination with a gasometer connected with the generator, a feed-water tank connected with the water-supply pipe, a hollow water-holding-displacing plunger in said tank connected with the gas-holder of the gasometer and means for admitting water to the plunger as it descends and withdrawing it therefrom as it ascends.

6. In an acetylene-gas-generating apparatus, the combination of a gasometer, a generator, a water-supply pipe leading to said generator, and a feed-water tank connected with the water-supply pipe; with a hollow displacing-plunger in said tank connected with the gas-holder of the gasometer, and means for admitting water to the plunger as it descends, and for emptying it as it ascends, substantially as described.

7. The combination with a generator, a water-supply pipe adapted to deliver water thereto, and means for conducting off the gas, with a gas-holder, a water-feed tank connecting with the gasometer water-supply pipe, and a hollow plunger in said tank adapted to displace water therein, and connected with and operated by said gas-holder and means for admitting water to the plunger as it descends and withdrawing it therefrom as it ascends, substantially as described.

8. In an acetylene-gas-generating apparatus, the combination of the gasometer, a water-feed tank within the gasometer-tank, a hollow displacing-plunger within the water-feed tank, suspended from the gas-holder and water-circulating connections between the plunger and gasometer-tank; with a generator beside the gasometer, a water-feed pipe connecting the gasometer with the upper part of the water-feed tank, and a gas-pipe connecting the gasometer with the gas-holder, all substantially as described.

9. The combination of a gasometer, a generator, a water-supply pipe adapted to deliver water to the generator, and means for conducting the gas therefrom; with a water-feed tank connecting with the generator water-supply pipe, a hollow plunger in said tank adapted to displace water therein, said plunger being connected with and operated by the gas-holder of the gasometer, and means for circulating water between the hollow plunger and gasometer-tank, substantially as and for the purpose described.

10. In an acetylene-gas-generating apparatus, the combination of the gasometer, a water-feed tank within the gasometer-tank, a hollow displacing-plunger within the water-feed tank, suspended from the gas-holder, and a siphon-pipe connection between the hollow plunger and the gasometer water-tank; with a generator beside the gasometer, a water-feed pipe connecting the gasometer with the upper part of the water-feed tank, and a gas-pipe connecting the gasometer with the gas-holder, all substantially as described.

In testimony that we claim the foregoing as our own we affix our signatures in presence of two witnesses.

HENRY HENLEY.
HENRY HOWE HENLEY.

In presence of—
CARTER PERRING,
C. O. MAPLE.